(12) United States Patent
Timmel et al.

(10) Patent No.: US 12,337,611 B2
(45) Date of Patent: Jun. 24, 2025

(54) VEHICLE WHEEL AND PRODUCTION METHOD THEREOF

(71) Applicant: CIP Mobility GmbH, Grünwald (DE)

(72) Inventors: Tristan Timmel, Chemnitz (DE); Wolfgang Nendel, Oederan/OT Schönerstadt (DE); Mirko Spieler, Gelenau (DE); Sebastian Iwan, Chemnitz (DE); Torsten Vogel, Thum-Herold (DE)

(73) Assignee: CIP MOBILITY GMBH, Grunwald (DE)

( * ) Notice: Subject to any disclaimer, the term of this patent is extended or adjusted under 35 U.S.C. 154(b) by 444 days.

(21) Appl. No.: 17/641,287

(22) PCT Filed: Sep. 1, 2020

(86) PCT No.: PCT/EP2020/074367
§ 371 (c)(1),
(2) Date: Mar. 8, 2022

(87) PCT Pub. No.: WO2021/047963
PCT Pub. Date: Mar. 18, 2021

(65) Prior Publication Data
US 2023/0264513 A1    Aug. 24, 2023

(30) Foreign Application Priority Data
Sep. 9, 2019 (DE) .............. 10 2019 124 145.6

(51) Int. Cl.
*B60B 1/08* (2006.01)
*B29C 45/14* (2006.01)
(Continued)

(52) U.S. Cl.
CPC .............. *B60B 1/08* (2013.01); *B60B 5/02* (2013.01); *B60B 27/0015* (2013.01);
(Continued)

(58) Field of Classification Search
CPC ....... B60B 1/08; B60B 1/003; B60B 27/0015; B60B 2310/204; B60B 2360/3412;
(Continued)

(56) References Cited

U.S. PATENT DOCUMENTS 2,042,160 A    5/1936  Pflager
4,280,736 A *  7/1981  Raudman ............... B60B 1/08
                                            301/35.59
(Continued)

FOREIGN PATENT DOCUMENTS

CN    104339971 A    2/2015
CN    109703284      5/2019
(Continued)

OTHER PUBLICATIONS

Machine Translation of CN 104339971 A, 8 pages (Year: 2015).*
(Continued)

*Primary Examiner* — S. Joseph Morano
*Assistant Examiner* — Emily G. Castonguay
(74) *Attorney, Agent, or Firm* — Amundsen Davis LLC

(57) ABSTRACT

The disclosure relates to a stable one piece wheel, which is particularly suitable for cycles having an increased system weight such as electrically powered bicycles or cargo bikes, and a method producing said vehicle wheel. Said vehicle wheel includes an annular portion, a plurality of spokes and a hub portion integrally formed by mould injection of fibre reinforced or carbo nano tubes containing thermoplastic, wherein each of the plurality of spokes comprise a substantially Z-shaped cross section with a middle leg and a pair of outer legs, wherein the angle enclosed by each of the pair of outer legs and the middle leg is greater than a right angle and wherein the length of the middle leg increases from the annular portion toward the hub portion.

16 Claims, 14 Drawing Sheets

(51) Int. Cl.
  *B29K 77/00*   (2006.01)
  *B29K 309/08*  (2006.01)
  *B29L 31/32*   (2006.01)
  *B60B 1/00*    (2006.01)
  *B60B 5/02*    (2006.01)
  *B60B 27/00*   (2006.01)

(52) U.S. Cl.
  CPC ..... *B29C 45/14311* (2013.01); *B29K 2077/00* (2013.01); *B29K 2309/08* (2013.01); *B29L 2031/32* (2013.01); *B60B 1/003* (2013.01); *B60B 2310/204* (2013.01); *B60B 2360/3416* (2013.01)

(58) Field of Classification Search
  CPC ...... B60B 2360/3416; B29C 45/14311; B29K 2077/00; B29K 2309/08; B29L 2031/32
  See application file for complete search history.

(56) References Cited

U.S. PATENT DOCUMENTS

| | | | |
|---|---|---|---|
| 4,330,914 A * | 5/1982 | Hood | B23P 11/00 |
| | | | 301/64.704 |
| 4,634,189 A * | 1/1987 | LeBlond | B60B 3/06 |
| | | | 301/64.704 |
| 4,930,844 A | 6/1990 | Giroux | |
| 5,184,874 A | 2/1993 | Olson et al. | |
| 5,246,275 A * | 9/1993 | Arredondo, Jr. | B60B 5/02 |
| | | | 301/95.104 |
| 2009/0236902 A1 | 9/2009 | Zibkoff | |
| 2019/0143745 A1 | 5/2019 | Ziller et al. | |

FOREIGN PATENT DOCUMENTS

| | | |
|---|---|---|
| DE | 10114407 A1 | 10/2002 |
| DE | 102016110280 A1 | 12/2017 |
| EP | 1083063 A2 | 3/2001 |
| EP | 3463927 B1 | 4/2020 |
| WO | 2019/133987 A1 | 7/2019 |

OTHER PUBLICATIONS

Machine Translation of DE 102016110280 A1, 12 pages (Year: 2017).*
First Office Action from the Taiwan Intellectual Property Office for Application No. 109125571 dated Jun. 27, 2022 (12 pages).
EPO Article 94 EPC Communication dated Sep. 8, 2023 for EU Patent Application No. 20768530.6 (4 pages).
First Office Action from the German Intellectual Property Office for Application No. 10-2019124145.6 dated Jul. 6, 2020 (8 pages).
PCT/EP2020/074367 International Search Report and Written Opinion of the International Searching Authority dated Nov. 18, 2020 (11 pages).
PCT/EP2020/074367 International Preliminary Report on Patentability and Written Opinion of the International Searching Authority dated Mar. 9, 2022 (8 pages).
First Office Action from the Japan Patent Office for Application No. 2022-504078 dated May 11, 2023 (with English Translation) (4 pages).
Notice of Allowance for Vietnamese Application No. 1-2022-00871 from Vietnamese Patent Office (1 page).
Dec. 5, 2024 Communication pursuant to Article 94(3) EPC received from the European Patent Office for patent Application No. 90768530.6-1015 (4 pages).
Oct. 30, 2024 Chinese Office Action received from the Chinese Intellectual Property Office for Applicaton No. 202010113639.6. (9 pages).
Jul. 26, 2024 Office Action received from the Korean Intellectual Property Office Korean Application No. 10-2022-7011037 (9 pages).
Notice of Allowance for Korean Application No. 1-2022-00871 from Korean Patent Office (1 page).

* cited by examiner

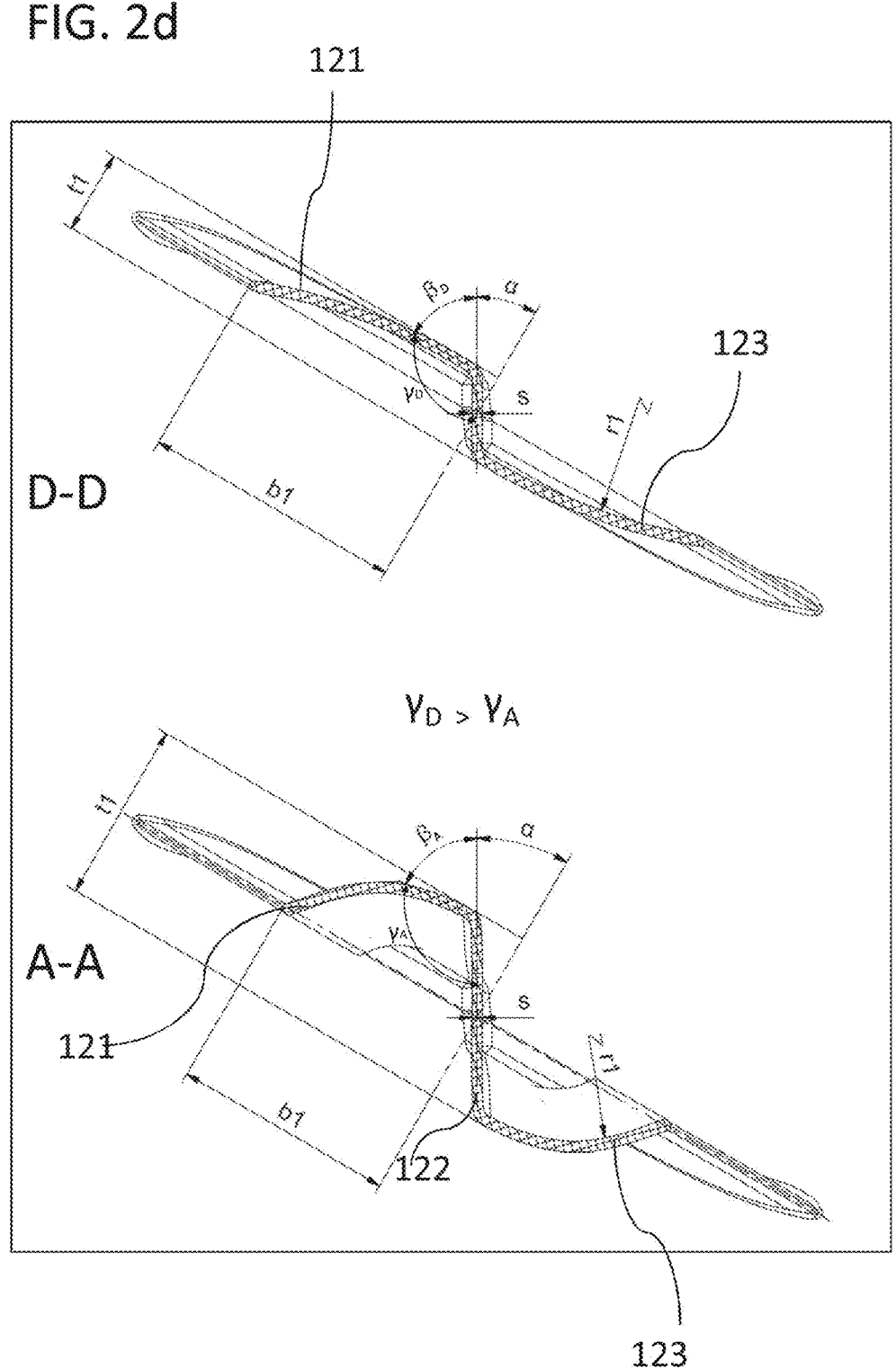

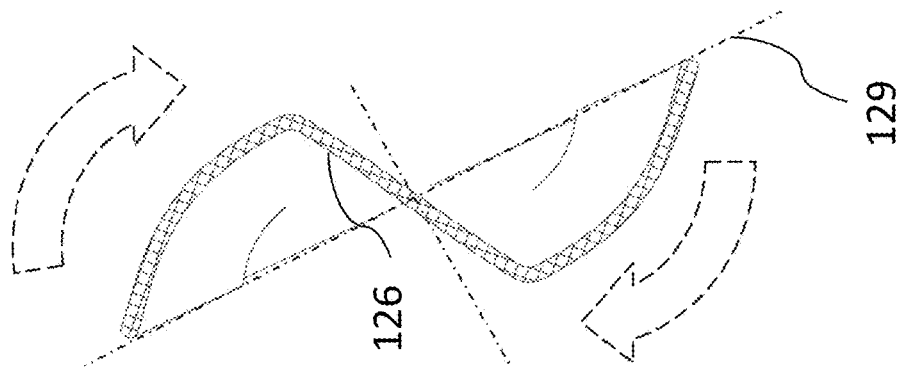
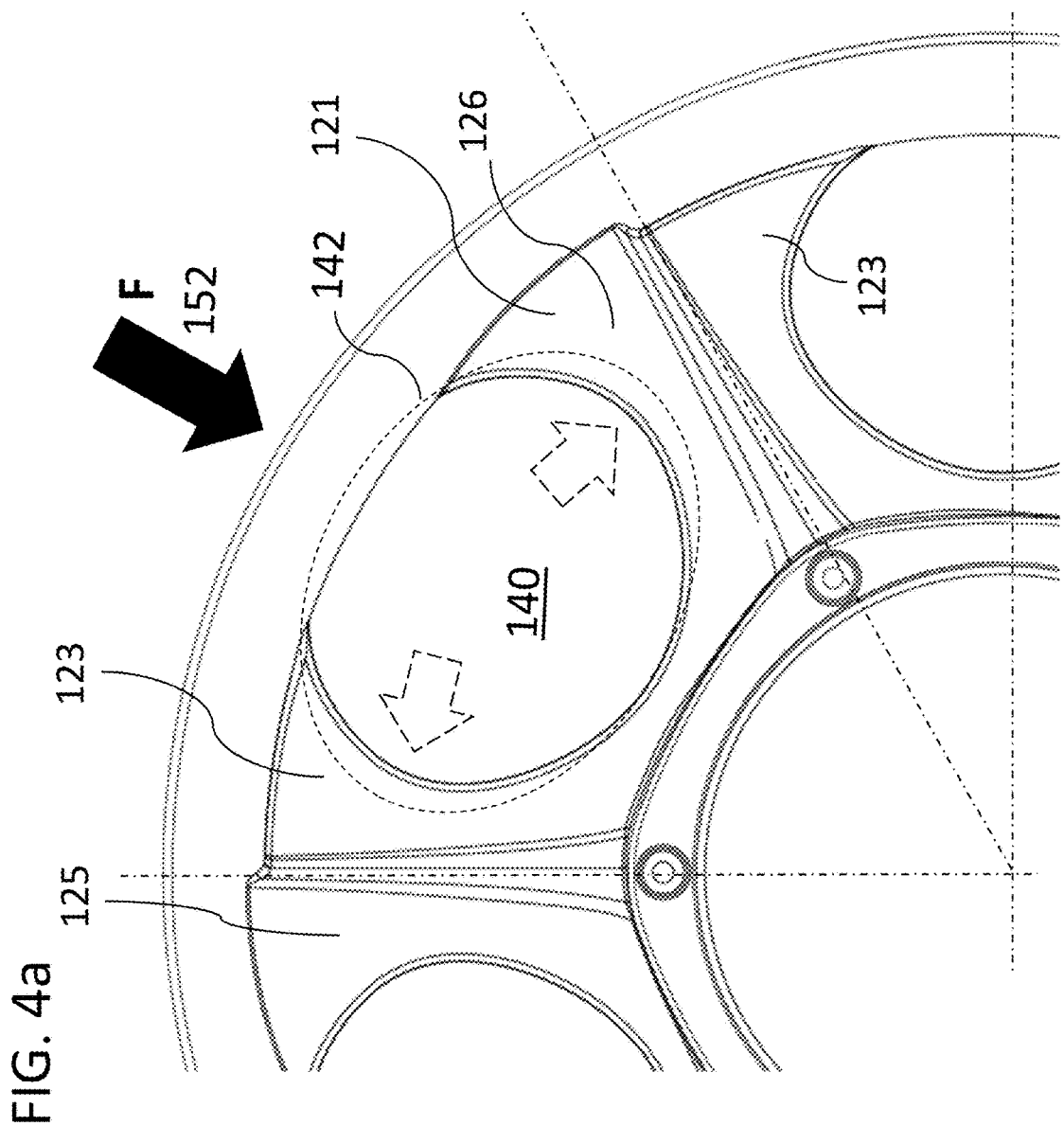
FIG. 4b
FIG. 4a

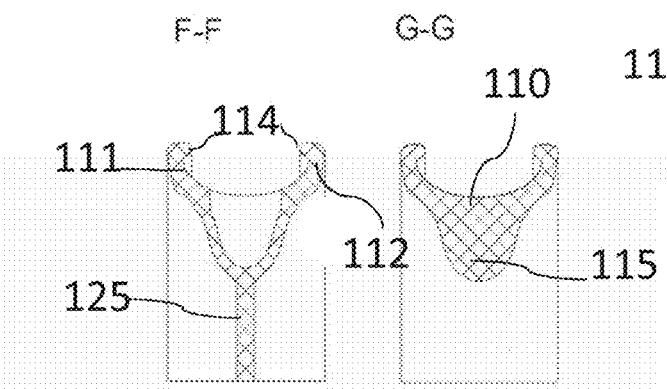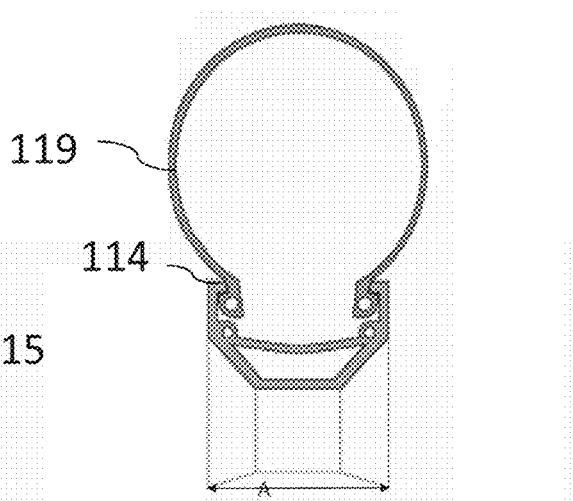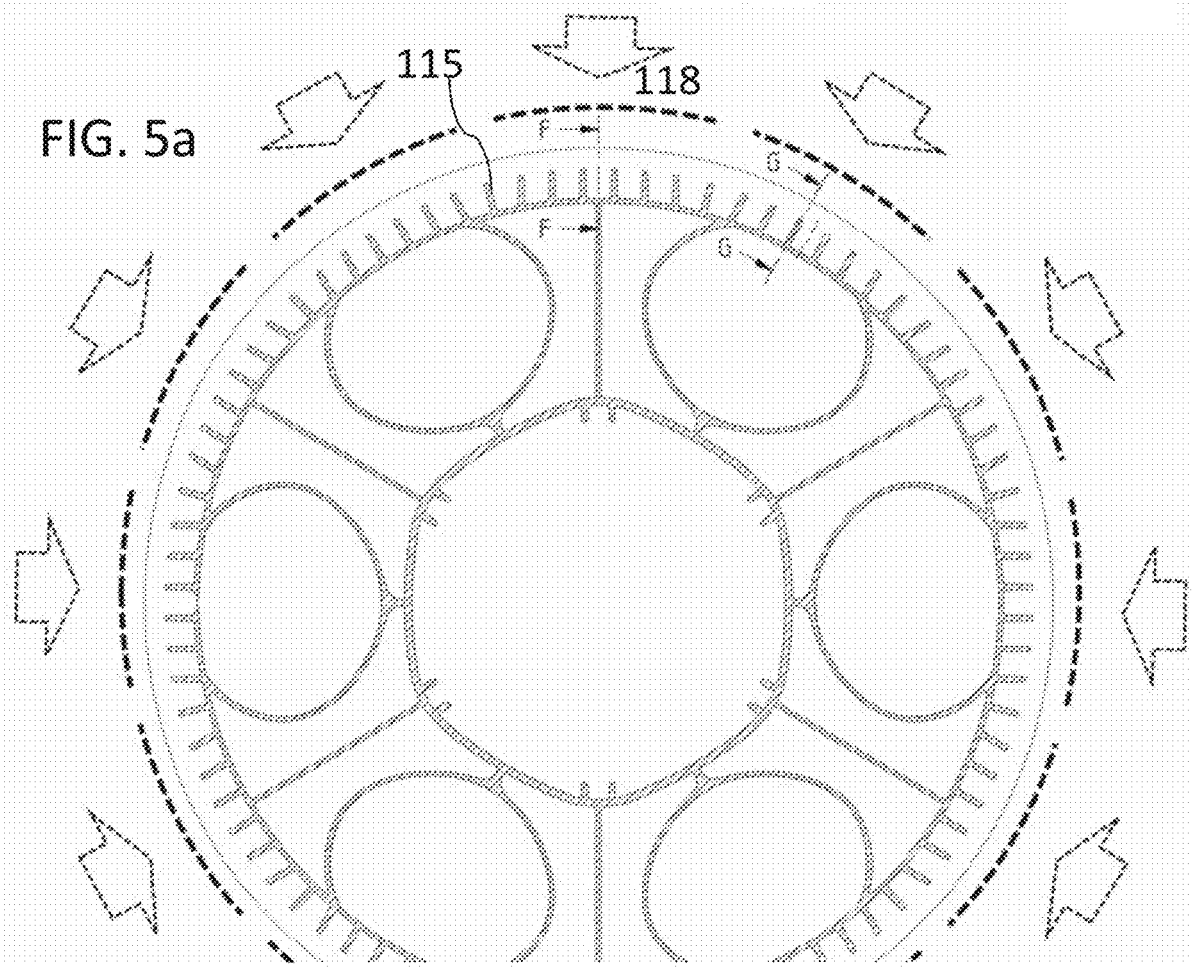

FIG. 7
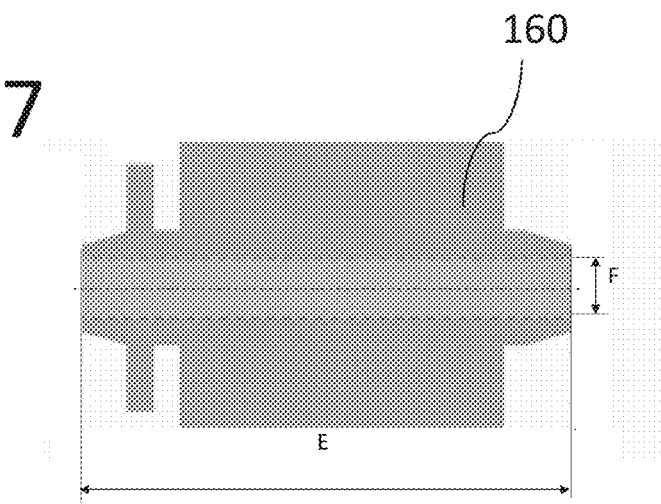
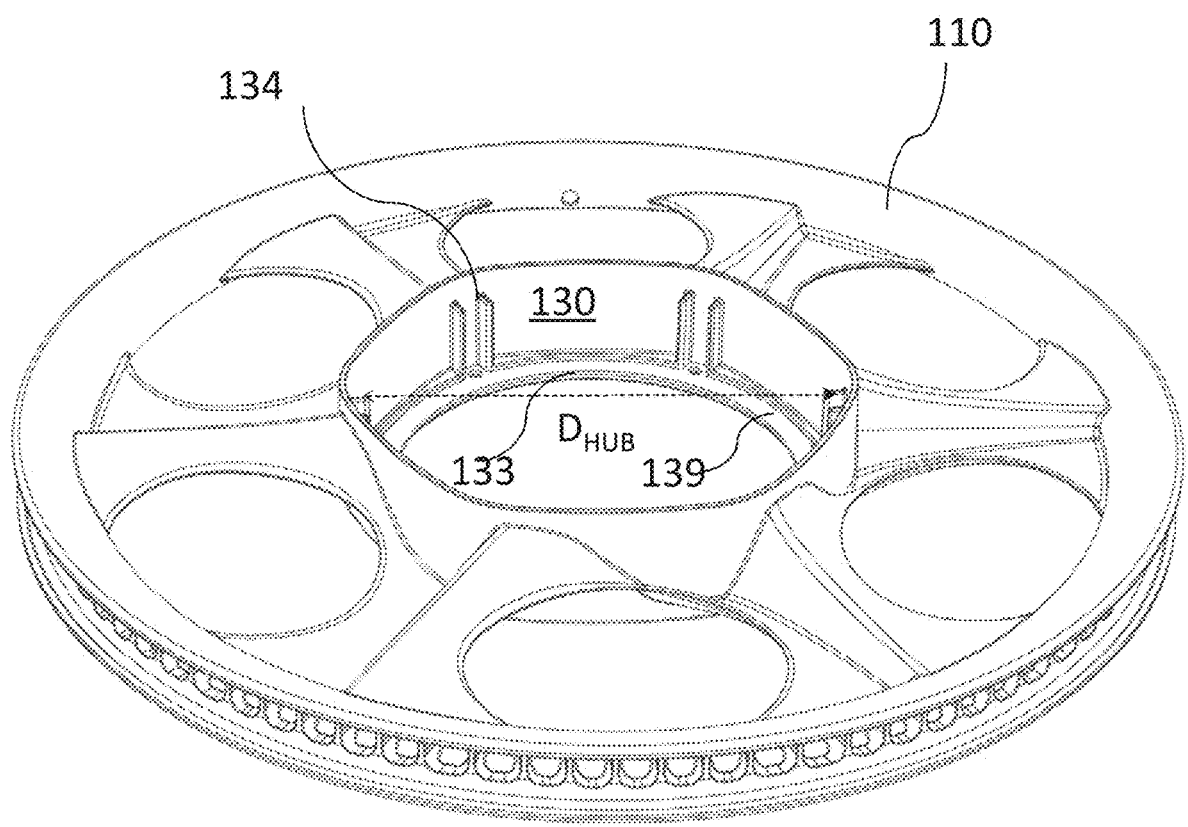
FIG. 8

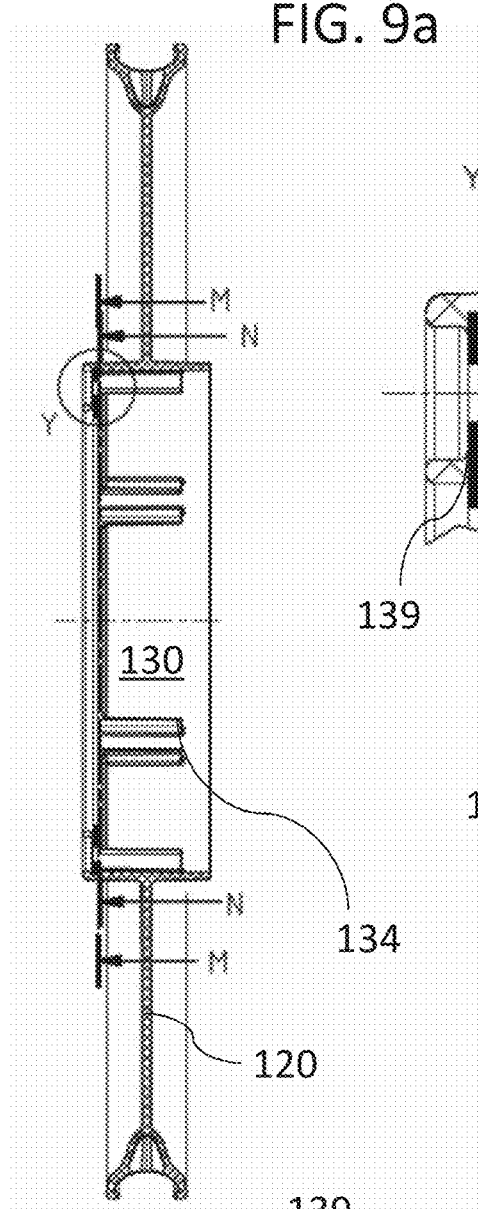
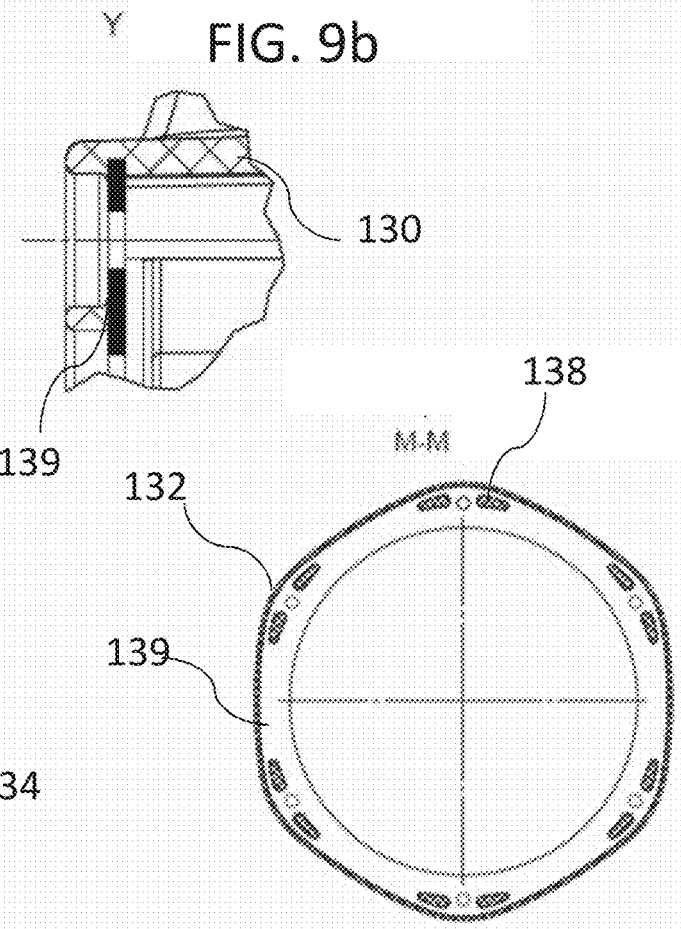
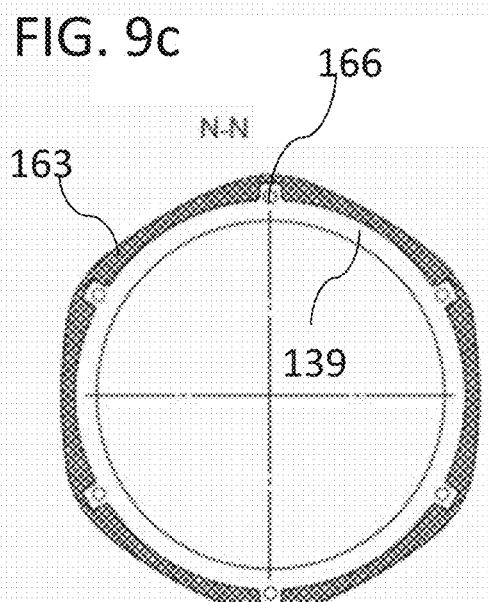
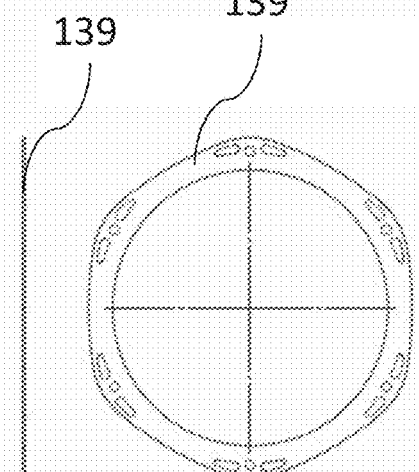
FIG. 9a
FIG. 9b
FIG. 9c
Fig. 9d
FIG. 10a
Fig. 10b FIG. 14a
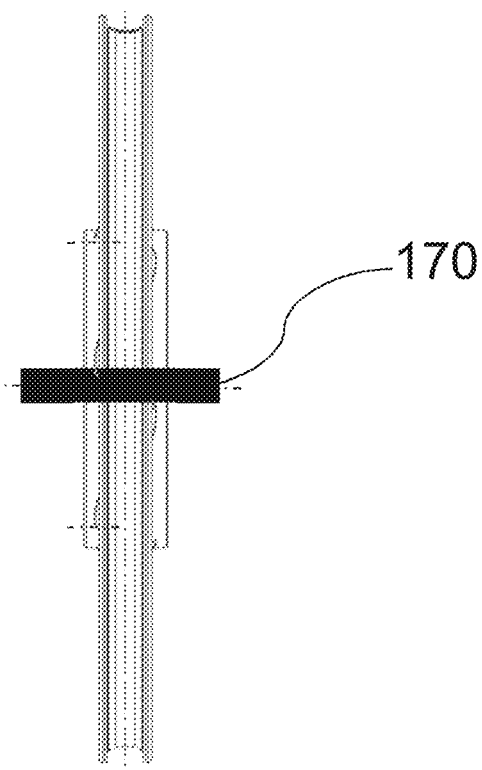
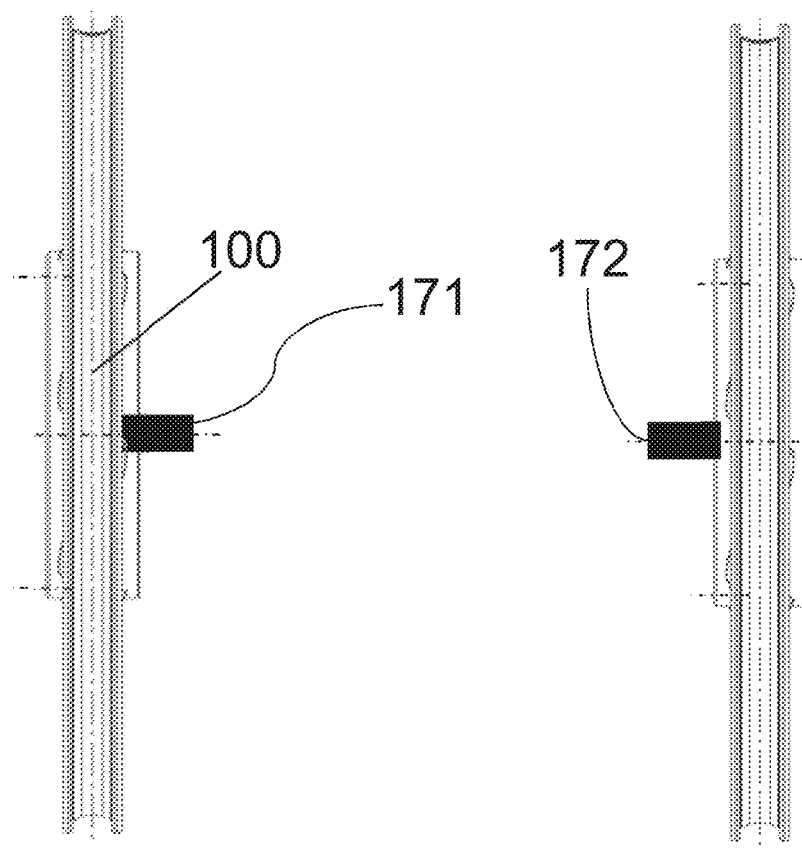
FIG. 14b                    FIG.14c

VEHICLE WHEEL AND PRODUCTION METHOD THEREOF

TECHNICAL FIELD

The present disclosure relates to the field of wheels for vehicles and more particularly to a one-piece thermoplastic wheel and a method for producing said wheel. Said wheel comprises a plurality of spokes between a hub and an annular portion and is particularly suited for cycles subjected to increased loads such as electrically powered bicycles or cargo bikes.

BACKGROUND

In view of the growing population in cities there is the need to optimize logistics systems within urban areas. From an environmental perspective there is further the need to reduce carbon dioxide production and to develop transport solutions toward sustainability. One possibility for improving urban mobility is to offer cycle sharing, fleet bikes, cargo, pedelecs or e-mobility bikes. Especially if the vehicle wheels are configured to carry cargo or use electrical power generated for example by a motor and battery the loads of the systems are increased with regard to conventional cycles.

It is known that vehicle wheels especially for cycles should be light weighted. However, the forces, which are applied to a vehicle wheel can be very high. Accordingly, there is the need to provide an affordable technical solution which at the same time provides sufficient rigid and stable vehicle wheels, more particular cycle wheels. Usually material and thus weight is added in favour of better materials strength.

In case of bicycle wheels commonly spokes are used to transfer the forces between an annular rim portion and a hub. Typically, a higher number of spokes correlates to a greater wheel strength and a fewer number of spokes correlates to a lighter wheel assembly. However, a cycle wheel having a lower spoke count must still be constructed to support loads associated with the operation of the cycle in order to prevent destruction especially in view of high speeds or high loads when using vehicles with electric traction or load-carrying bikes.

An object of the present invention is to overcome the foregoing problems in the prior art and provide a resin wheel excellent in mechanical properties and at the same time provide a light weight product. Another object of the present invention is to provide a system that can improve mechanical strength and flexibility against overload peaks.

A further object, is to address the problem of relaxation and creep of the thermoplastic material and provide a secure and stable connection between the hub and another component such as an axle, an electric motor, a hub dynamo, a freewheel or an internal gear hub. Especially for a wheel of electrically powered cycles, wherein the motor is positioned in the hub of the wheel, it is further desired to improve the heat removal or insulation of an electronic motor.

Finally, besides having its remarkable sales point in reduced weight and a reinforcing structure the possibility of mass production of the wheel should be ensured. This characteristic is advantageous for cost reduction as well as for the production of fleet bikes. The wheels should further be long-lived and easy to maintain.

SUMMARY OF THE INVENTION

The above objects are solved by a vehicle wheel according to claim 1, which is particularly suitable for cycles, electric cycles and cargo bikes, and which comprises an annular portion, a plurality of spokes and a hub portion integrally formed by mould injection of fibre reinforced or carbon nano tubes containing thermoplastic, wherein each of the plurality of spokes comprise a substantially Z-shaped cross section with a middle leg and a pair of outer legs, wherein the angle ($\gamma$) enclosed by each of the pair of outer legs and the middle leg is greater than a right angle and wherein the length of the middle leg increases from the annular portion toward the hub portion. The present invention also provides a method for producing the vehicle wheel. Other features and advantageous embodiments of the vehicle wheel and the production thereof are specified in the dependent claims. The invention will be more readily understood from the following description and the accompanying drawings.

A characteristic feature of the vehicle wheel is that each of the plurality of spokes comprise a substantially Z-shaped cross section with a middle leg and a pair of outer or side legs, wherein the angle ($\gamma$) enclosed by each of the pair of outer legs and the middle leg is greater than a right angle and wherein the length of the middle leg increases from the annular portion toward the hub portion. The oblique Z-profile of each spoke allows a low-weight design of the spokes and contributes to the stability of the wheel.

The use of a Z-profile allows to increase the length of the connection line of the spoke to the annular portion along which forces are communicated between the hub and the rim of the annular portion. The rim is the part of the wheel on which a tire such as a tubular tire or clincher is mounted. Further, the increasing width of the middle leg of the Z-profile toward the hub increases further the stability. In this way high vertical impact load for example directed in the same direction as the longitudinal axis of a spoke can be tolerated, such as experienced when riding through potholes.

Depending on the material used and the desired stability the weight of a 24-inch wheel is in the range of 900 g to 2000 g, preferably between 900 g or 1000 g and maximum weights of 1250 g. The weight ranges given is the weight of a reinforced thermoplastic without any potential additional inserts such as a metal insert or the like.

In contrast to common metal bikes having over 30 spokes the technical solution according to the present invention using reinforced thermoplastic reduces significantly the number of parts and components and allows a large freedom of styling. By using thermoplastic, the design property as coloration can be improved and it is for example possible to add reflective materials to the carbon or glass-fiber reinforced material. Fabricating the vehicle wheels from thermoplastic materials, such as polymers, allow the cast into injection tools via injection molding processes thereby providing an efficient production of vehicle wheels that may be recycled.

According to a further aspect of the invention the middle leg of the Z-cross section is angled (a) with regard to the rotational axis of the wheel.

According to a further aspect of the invention each of the outer legs comprise at least one curved portion directed towards the middle leg.

By having one or more curved portion the outer legs of two outer legs of adjacent spokes can be at least partially sinusoidally connected to one another at the hub portion thus providing a smooth transition between the spokes. Further a curved portion can be provided at an intersection of point of an outer leg with the middle leg thereby forming a rounded corner. This continuous junction reduces stress peaks as notch stress during later use. Further the production of the vehicle wheel using injection molding with injection tools is simplified because sharp edges and undercuts are avoided.

According to a further aspect of the invention the radius of the curved portion increases toward the annular portion. In this manner the curvature of the curved legs flattens such that at the end portions of said flattened outer legs can approach the middle axis of the annular portion. Thereby the Z-cross section can provide not only a high vertical stability but also a high lateral stability. Such lateral forces (see arrow 154 in FIG. 3b) usually occur in the proximity of the annular portion or at the edge of the rim when travelling on a curved path and colliding with unmoved or moved objects from the side as during accidents.

Simulation results showed that the safety requirements for bicycles according to the standardized norms as DIN EN ISO 4210.6:2012-11 with a lateral load of 370 N can be met with the vehicle wheel and spoke geometry of the present invention. Further the results of the simulation for a temperature of 80° C. showed that vertical impact loads up to 4000 N for bilaterally suspended bicycles can be absorbed. The wheel according to the invention thus meets high safety requirements.

According to another aspect of the invention the curved portions of the outer legs have a radius (r1) in a range between 3 to 20 mm and each Z-shaped cross section has a wall thickness (S) in a range between 1.5 to 5 mm, preferably 2.5 to 3 mm.

The above excellent stability characteristics in vertical and lateral direction and further including the absorption of torques produced by braking or by accelerating the cycle can be achieved with the above mentioned relatively small wall thickness ranges of the spokes.

According to another aspect of the invention the length of the outer legs is continuously increased towards the region for connection to the annular portion in order to widen the line, along which the Z-profile is connected to the annular portion. In this way again the stability of the wheel can be increased.

According to another aspect of the invention the Z-shaped cross section of each spoke is configured to be torsionally elastic for the compensation of a load, which is directed substantially vertical to the outer periphery of the annular portion in a section between two adjacent spokes.

One of the criticalities, when it comes to operation of a wheel having a lower than normal spoke count and vertical load impacts occur, lies in the fact that there are sections of the annular portion, where no spokes are connected and therefore there are local load peaks in this area. This problem is addressed by the present invention by means of the Z-shaped spokes, which are configured to elastically respond when forces are directed vertical with regard to a spokeless section of the annular portion. In other words, the vehicle wheel according to the invention relies on elastic flexing of members i.e. each outer leg of a pair of adjacent Z-shaped spokes such that it can efficiently dissipate the energy introduced by vertical load impacts into the spokeless section of the annular portion.

According to another aspect of the invention the outer legs of each Z-cross section is configured to allow deflection into the direction of a curvature.

In the case of a vertical impact between two spokes, wherein the force is introduced at the same distance to each of the adjacent spokes, the outer legs facing each other each deflect in analogy to a torsion bar spring and distribute the load of the vertical impact equally to both spokes.

According to another aspect of the invention the wheel comprises at least four spokes and the ends of the legs of each spoke are interconnected at the hub in order to form semicircular or at least partially elliptic windows defined between the annular portion and pairs of adjacent spokes.

The wheel comprises at least four spokes, preferably 6 spokes. In this manner the geometry of the windows between two spokes is semicircular or at least partially elliptic such that notch stress can be avoided. Especially in the case that the hub portion geometry is configured such that larger components as an electric motor can be received, the windows will be substantially elliptic having a longitudinal axis parallel to a tangent through the vertex at the annular portion.

According to another aspect of the invention the hub portion comprises a metal insert or a plastic insert connected with injection molding or by utilizing residual heat of the injection molded hub portion configured to hold at least one of an axle, an electric motor, a hub dynamo, an internal gear hub, freewheel or a wheel bearing, wherein the wheel suspension can be configured unilateral or bilateral.

In this manner the vehicle wheel can be securely connected to various components. It is noted that the vehicle wheel with an insert is still having light weights. In case of a wheel for a 24 inch tire the weight of a wheel with a metal insert ranges between 1200 g and 1450 g. As metal for example steel can be used.

According to another aspect of the invention the metal insert comprises apertures for an injection molded and form-fitting connection.

In this way the connection of the metal insert is improved. These apertures can have various forms such as a drop shape.

According to another aspect of the invention the hub portion is pseudo-pentagonal or pseudo-hexagonal shaped with rounded corners having at one side a radially inwardly extending rim or flange for mounting an electric motor, wherein each of said corner comprises vertically extending pair of ribs for guiding the connecting elements and forming an air gap, when the electric motor is mounted.

By means of providing an air gap an isolation against heat, that maybe generated by the mounted electric motor, is provided.

According to another aspect of the invention the fiber reinforced thermoplastic has a glass-fiber content of 20 to 65% by weight and said thermoplastic is selected from PA6, PA6.6 or a mixture thereof.

Said polymers and mixtures of PA6 and PA6.6 have a good flow behaviour and can be easily processed such that it can be well applied for stressed functional parts such as vehicle wheel. The material of the produced wheel is stable within a temperature range of −20° and 80° C. The inventors have conducted research and found by experiments that especially a blend of PA6 and PA6.6 comprising 30% glass fiber is suited for the vehicle wheel. Suitable glass-fiber reinforced thermoplastics are commercially available, for example under the trade name Grivory® from EMS-Grivory, EMS Chemie AG, Switzerland.

Simulations of the behaviour of the vehicle wheel having a PA6 and PA6.6 mixture with 30% glass fiber as provided by EMS-Grivory® under Grilon TSG-30 (TS=PA66+PA6; G=glass fiber reinforced) showed, that even with a material temperature of 80° C. and presumed introduced forces comprising one of a vertical impact of 4000 N, a braking torque of 305 N and a lateral load of 370 N in accordance with EN ISO 4210-6; 2012-11 no permanent deformation of the material occurred. Any observed minor deformation of the wheel occurred within the elastic limit of the material.

According to another aspect of the invention a preferred glass-fiber-reinforced or carbon Nano tubes containing thermoplastic has a tensile stress at break of 100 MPa to 300 MPa, and an E modulus of at least 6000 MPa up to 30 Gpa, preferably 15 GPa to 25 GPa. The tensile strength and E-modulus are in accordance with the European norm EN ISO 527.

According to another aspect the annular portion comprises a rim with a symmetric profile, which has two diverging legs directed radially outward, wherein each end portion has an integrally formed rim flange protruding inwardly towards the symmetry axis of the profile.

Based on this rim design the rim forms an open hollow profile in the outward radial direction, which can be configured as a V-shaped, U-shaped, trapezoidally shaped or curved shapes with a plurality of curved portions at each leg. By means of the protruding rim flange clincher tires can be hold. These tires have a wire or aramid fiber bead that interlocks with flanges in the rim According to another aspect of the invention a method for producing a vehicle wheel is provided, wherein the method comprising the following steps: injection molding a fiber reinforced or carbon nano tubes containing thermoplastic to integrally form a one-piece body comprising an annular portion, a plurality of spokes and a hub portion, wherein the plurality of spokes form a substantially Z-shaped cross section with a middle leg and a pair of outer legs, wherein the angle ($\gamma$) enclosed by each of the pair of outer legs and the middle leg is greater than a right angle; and wherein the length of the middle leg increases from the annular portion toward the hub portion.

According to another aspect of the invention the method further comprises: connecting an insert of metal or plastic to the hub portion by injection molding through apertures of said inlet and backmolding at least a part of the insert in a force- and/or form-fitting manner.

In this manner the insert can be rigidly affixed to the hub portion.

According to another aspect of the invention the method further comprises: providing and extracting a plurality of radially arranged sliders with a collapsible core in the injection tool to form an annular portion comprising a rim with a symmetric profile, which has two diverging legs directed radially outward, wherein each end portion has an integrally formed rim flange protruding inwardly.

A further advantage of the method of production of wheels according to the invention is that the production is scalable to any conventional dimensions and rim dimensions for bicycles and cargo bikes as specified for example by the ETRTO (European Tire and Rim Technical Organization). Preferred nominal wheel diameters are those suitable for tire dimensions of 16 to 28 inches, more preferably 18 to 26, further preferably 20 to 26 inches, most preferably 20 or 24 inches. The rim widths (width of the hollow profile) are preferably 14 to 35 mm, more preferably 25 to 32 mm. In the case of clincher tires, the outer tire width is preferably 2.3 inch and can be combined for example with an outer tire diameter of 24 inch.

BRIEF DESCRIPTION OF THE FIGURES

The accompanying figures illustrate exemplary embodiments of the disclosure and serve to explain, by way of example the principles of the disclosure and are not intended to be drawn to scale. The figures are included to provide illustration and a further understanding of the various aspects and embodiments, but are not intended to restrict the disclosure to the embodiment illustrated in the figures and are not necessarily to scale. Where technical features in the figures or detailed description are followed by references signs, the reference signs have been included for the sole purpose of increasing the intelligibility of the figures and description. For purposes of clarity, not every component may be labelled in every figure.

FIG. 2b shows a detail of FIG. 2a;

FIG. 2c shows four cross sections of the spoke as indicated in FIG. 2a;

FIG. 2d shows details of two cross section of the spoke;

FIG. 4a shows schematically a vertical force applied in between two spokes;

FIG. 4b shows schematically the torsion of a Z-shaped cross section of the spoke;

FIG. 5a shows schematically the production of the annular portion;

FIG. 5b shows two cross section of the annular portion shown in FIG. 5a;

FIG. 5c shows an annular portion with a tire inserted in the hollow profile of the rim;

FIG. 7 shows schematically an axle with housing to be inserted into the hub portion;

FIG. 8 shows a perspective view of the vehicle wheel;

FIGS. 9a to 9d show cross sections and details of the vehicle wheel and hub portion including an insert;

FIGS. 10a and 10b show a plan and side view of the insert;

FIGS. 14a to 14c shows unilateral and bilateral suspensions.

DETAILED DESCRIPTION OF THE FIGURES

FIG. 1 shows a plan view of a vehicle wheel 100 according to an embodiment of the present invention. The vehicle wheel consists of only one piece which can be subdivided into three main portions:

The annular portion 110, a plurality of spokes 120 and the hub portion 130.

Figure 1A:
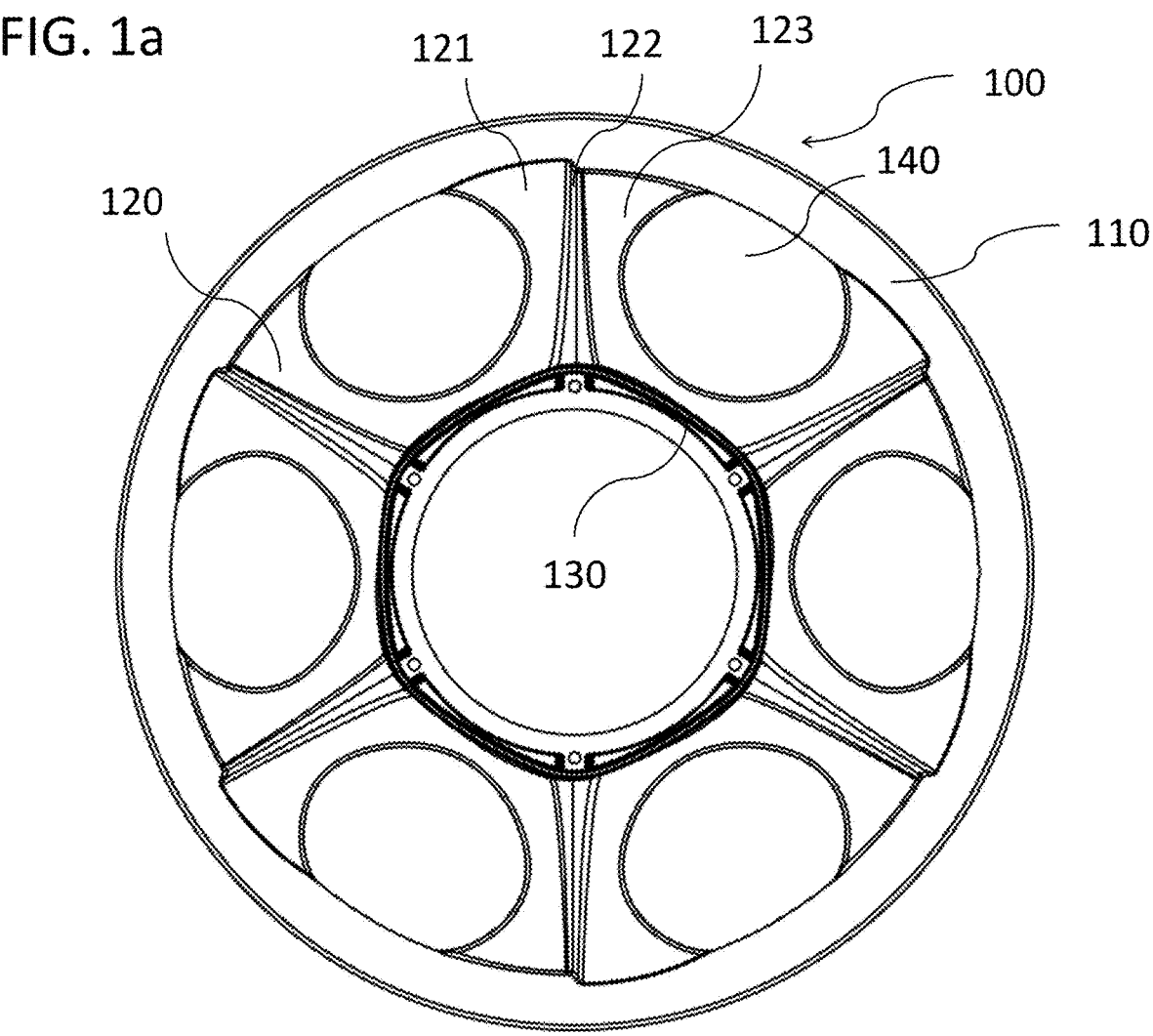
FIG. 1a shows a plan view of the vehicle wheel according to an embodiment of the present invention.
Figure 1B:
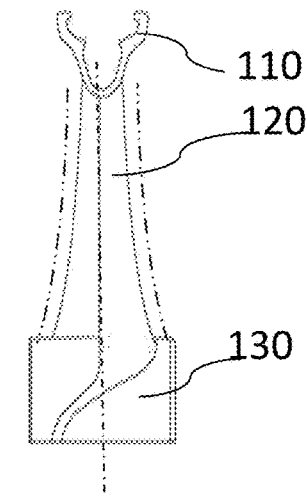
FIG. 1b shows a sectional view of a spoke of the vehicle wheel.
Figure 1C:
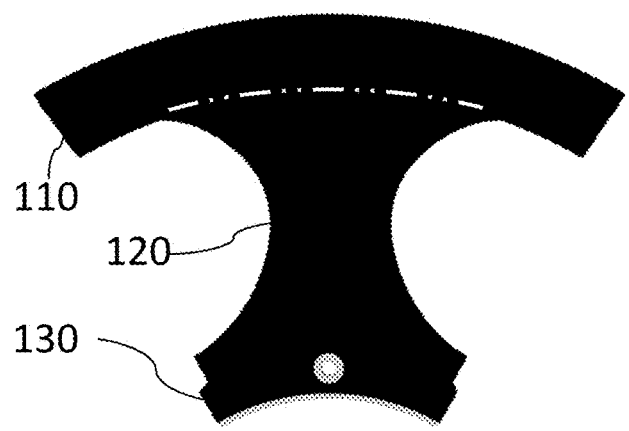
FIG. 1c shows schematically a single spoke.

The view of the vehicle wheel shown in FIG. 1a illustrates the side, wherein the hub portion 130 is configured to receive an axle (not shown) and optionally other components 160 such as an electric motor, a hub dynamo, an internal gear hub, a freewheel or a wheel bearing. Accordingly, the vehicle can be used for distinct purposes such as for cycles having an electric motor positioned in the centre of the wheel as well as for cargo carrying bi- or tricycles.

One characteristic feature of the vehicle wheel is that each of the plurality of spokes comprise a substantially Z-shaped cross section with a middle leg 122 and a pair of outer legs 121 and 123. Further the width of the middle leg 122 increases from the annular portion towards the hub portion 130. In this way the spoke tapers in direction to the annular portion or rim. This geometry is illustrated by the dot-dashed curved lines in FIG. 1b, which shows a section of a spoke 120 of the vehicle wheel 100. Further, in FIG. 1c the white dot-dashed line illustrates the extended cross section realized by the Z-profile of the spoke 120, which enables the spoke to transmit high loads from the rim 110 to the hub 130 and vice versa.

Figure 2A:
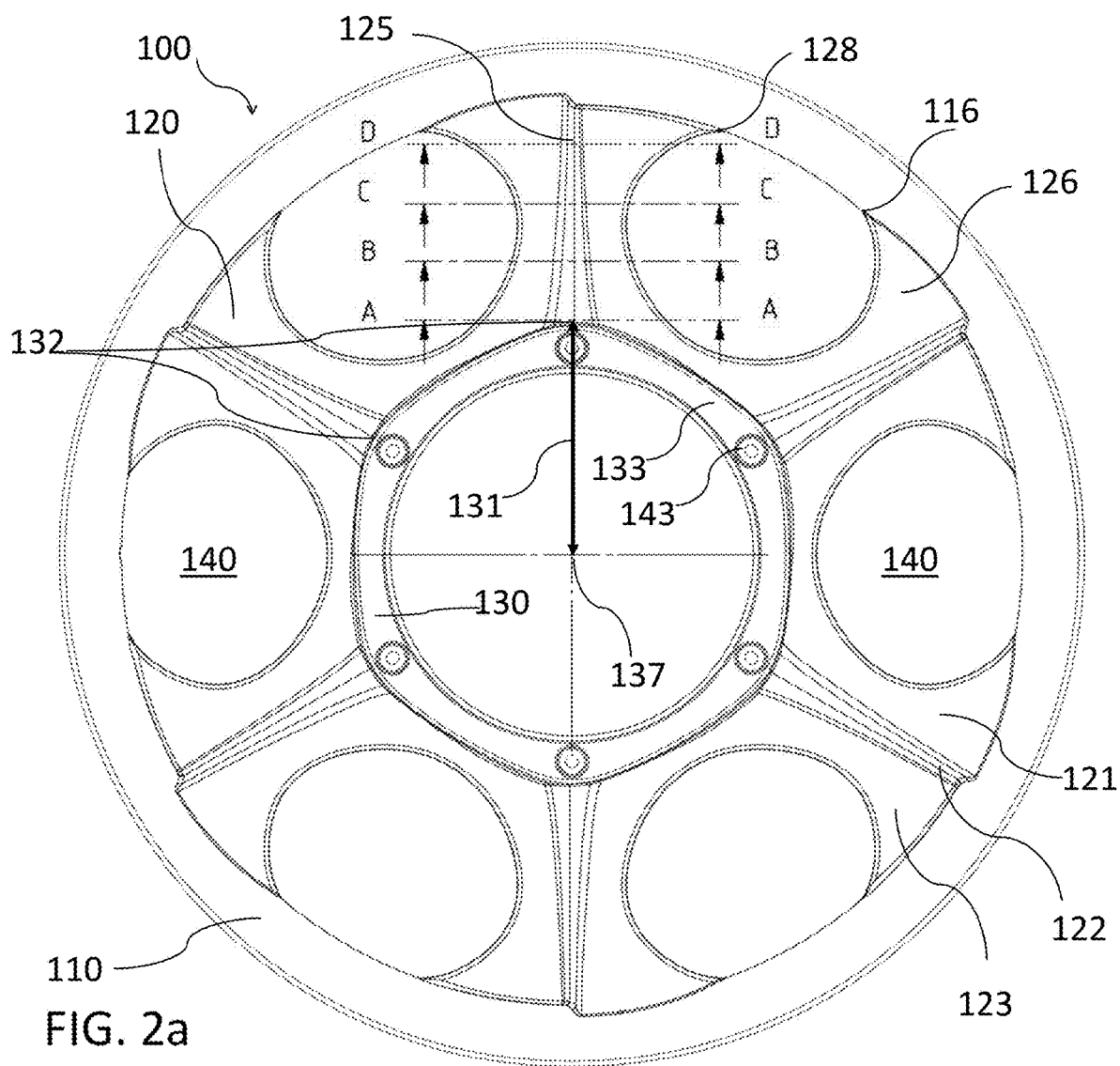
FIG. 2a shows another view of the vehicle wheel.
Figure 2B:
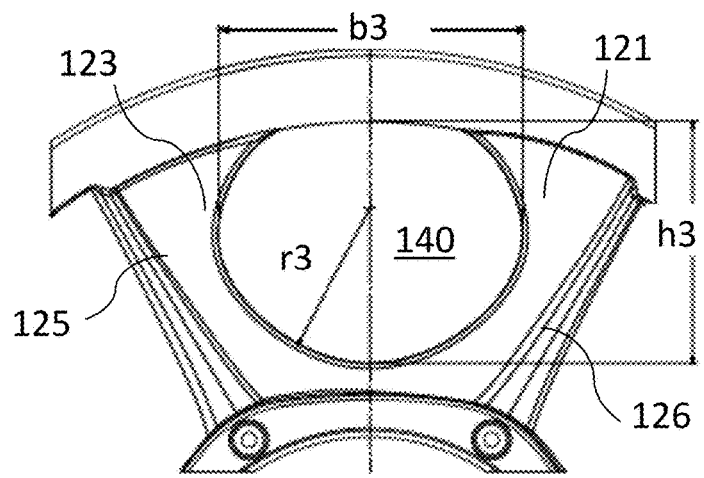

FIG. 2a shows an illustration of the opposite side with respect to the view shown in FIG. 1a of the vehicle wheel 100. Each pair of adjacent spokes 125, 126 and the respective section of the annular portion 110, which extends between the intersection points of each spoke with the rim (see reference numerals 128 and 116), defines a window 140. Said window is substantially forming an ellipse having the length b3 and width h3 as shown in FIG. 2b. This window 140 forms also a substantially semicircular section indicated by radius r3, which is defined by the outer side legs 123, 121 of the pair of adjacent spokes 125, 126. Said outer legs 123, 121 join each other at the proximity of the hub portion 130.

The embodiment shown in FIG. 2a has 6 spokes and a pseudo-hexagonal hub portion 130 with a radius 131 extending from the rotational axis 137 of the vehicle wheel to the outer edge of rounded corner 132 of the pseudo hexagon. Accordingly, the spokes have preferably the same distance from adjacent spokes. Alternative designs with 3 to 5 spokes are also possible. The geometry of the hub portion 130 is configured such that larger components as an electric motor can be received. Based on this geometry of the hub portion 130 the ellipse of the window 140 will be substantially elliptic having a longitudinal axis parallel to a tangent through the vertex at the annular portion 110.

Figure 2C:
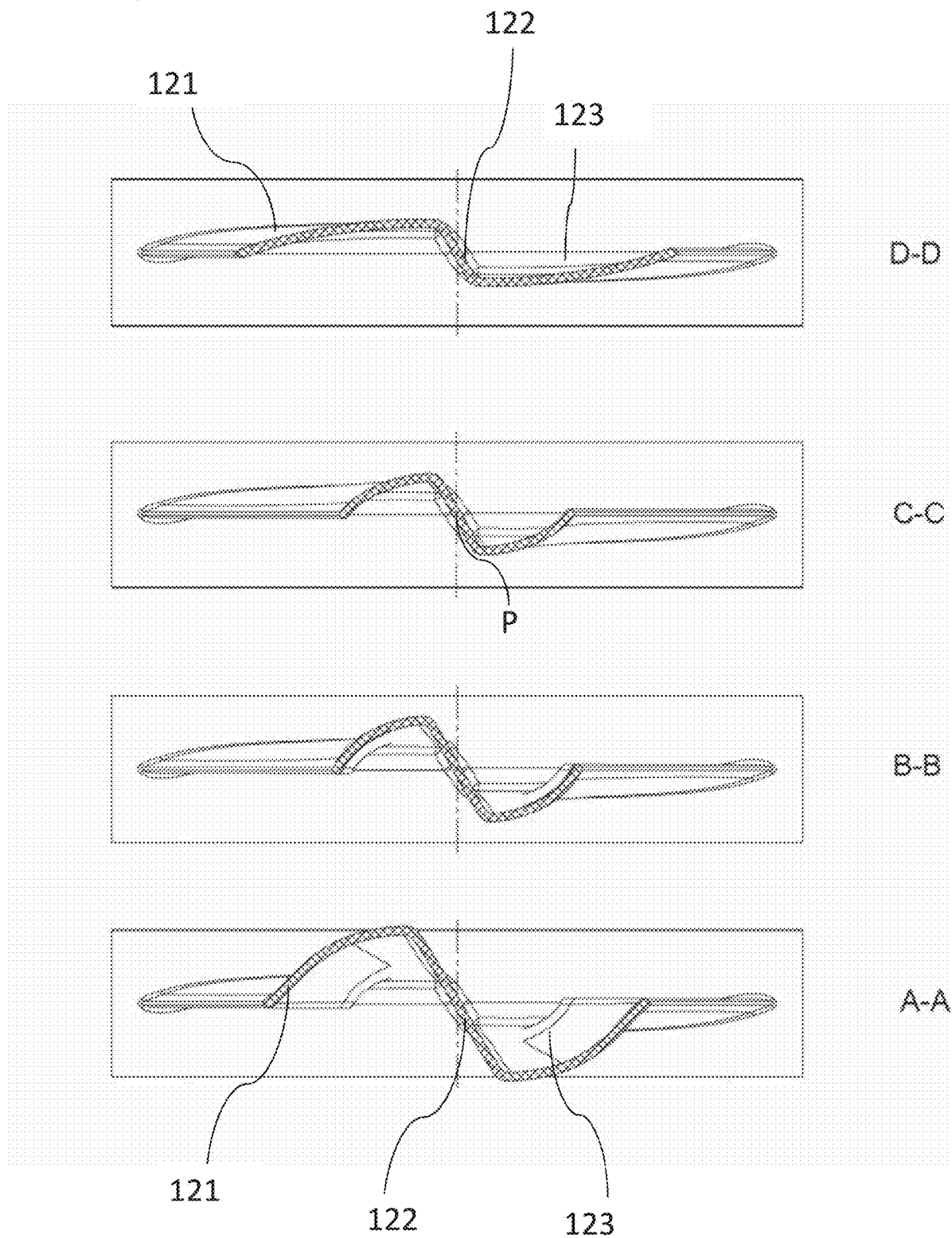

Moreover, FIG. 2a indicates by broken lines 4 sections A-A, B-B, C-C and D-D of the spoke 125, which can be for example 30 mm apart from each other. Said cross sections are shown in FIG. 2c and FIG. 2d, respectively. They show that all four Z-shaped cross sections are point symmetric, wherein the symmetry center P lies at the intersection point of the vertical axis (dashed line) and the longitudinal axis of the middle leg 122.

The dashed line of each cross section is parallel to the rotational axis of the wheel. That is to say the middle leg 122 is angled (a) with regard to the rotational axis of the vehicle wheel. This oblique Z-profile forms a flatter spoke with regard to the middle plane of the wheel disk than a Z-profile with a middle leg which extends parallel to the rotational axis 137 and is vertical to the middle plane of the wheel disk. In this context "wheel disc" means the part of a wheel which comprise supporting member between the axle or hub portion and the rim. Flattening the Z-shaped cross section by means of inclining the middle leg 122 as well as curving the outer legs 121, 123 towards the middle leg 122 is especially advantageous at the connection line of the annular portion, which only has a limited width.

Each of the outer legs 121, 123 comprises at least one curved portion directed towards the middle leg 122, wherein the radius (r1 see also FIG. 2d) of the curved portion increases toward the annular portion. Preferably the curved portions have a radius (r1) in a range between 3 to 20 mm. Moreover, the transition from the outer or side legs to the middle legs are rounded in order to reduce notch stress.

Sections C-C and B-B represent the mid portion of the spoke 120 and they have shorter lengths of the Z-profiles than the sections A-A and D-D. Further the length of the middle leg increases from the annular portion toward the hub portion (from section D-D—to A-A).

FIG. 2d shows details of the sections A-A and D-D which are close to the hub portion and annular portion respectively. The angle γ enclosed by each of the pair of outer legs 121, 123 and the middle leg 122 is greater than a right angle, wherein the length of the middle leg increases from the annular portion toward the hub portion.

FIG. 2d further indicates the thickness S of the wall of the middle leg 122. The thickness of each leg is constant along the spoke. As can be seen the Z-profiles form solid-body spokes and are not formed as hollow spokes. Accordingly, weight can be saved by providing relative thin walls. Preferably each Z-shaped cross section has a wall thickness S in a range between 1.5 to 5 mm, preferably 2.5 to 3 mm.

FIG. 2d shows in section D-D, which is close to the annular portion 110, the extension t1, which is parallel to the rim width and the extension b1 of each outer leg at section D-D parallel to the longitudinal axis of the rim. Whereas t1 is significantly increased in the Section A-A close to the hub, b1 close to the hub portion 130 is shorter than b1 close to the annular portion 110.

Along the outer circumference of the hub portion 130 the outer legs 121, 123 of the spokes 120 form a at least partially sinusoidal connection line 136, because each outer leg of a spoke is connected to the leg of the adjacent spoke. This provides a smooth transition between the spokes 120, wherein the waveform form is limited to the section between the adjacent middle legs.

Figure 3A:
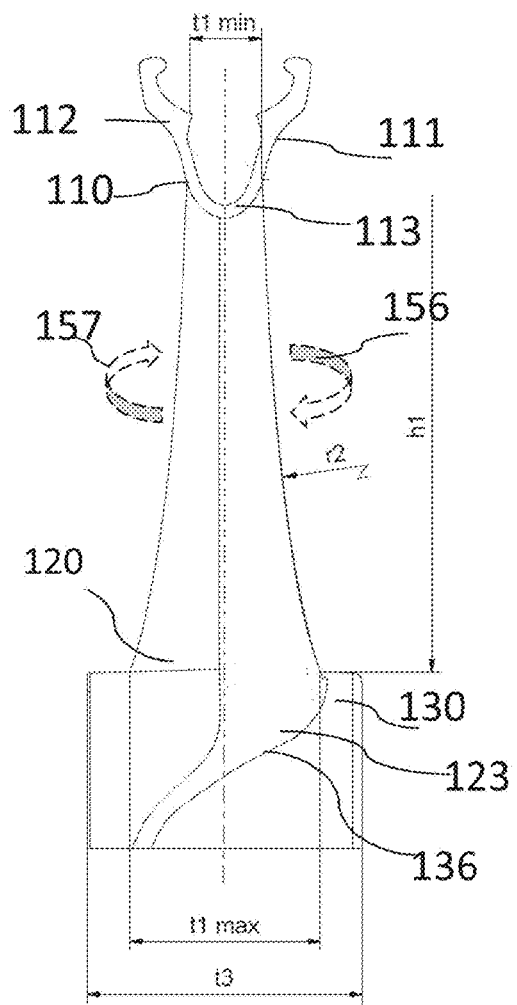
FIG. 3a shows a section vertical to the wheel disk along a spoke.

FIG. 3a shows another cross section of a spoke, which is vertical to the wheel disk plane and along a spoke, having a height h1. FIG. 3a shows at the joint to the hub portion a partial sinusoidal connection line 136 between the outer leg 123 of the illustrated spoke and an adjacent spoke (not shown). The width of the spoke t1 is illustrated and shows the maximum extension t1max at the hub portion 130 and the minimum extension t1 min close to the bottom 113 of the annular portion 110, wherein the transition between t1 max and t1 min is continuous and results in a tapering spoke 120 with a concave outer line having the radius r2 (not shown in its full length).

The width t1 is less than the width t3 of the hub portion. The width t1 min is less than the maximum width of the rim of the annular portion. The annular portion 110 forms a rim with an open hollow profile in the outward radial direction, which is a modified V-shaped with curved shapes at each of the legs 111 and 112 having curved portions at each leg. Further the arrows 156 and 157 indicate that the spoke can be twisted in the case that between two adjacent spokes a vertical force 152 is applied as indicated in FIG. 3b with arrow 152.

Figure 3B:
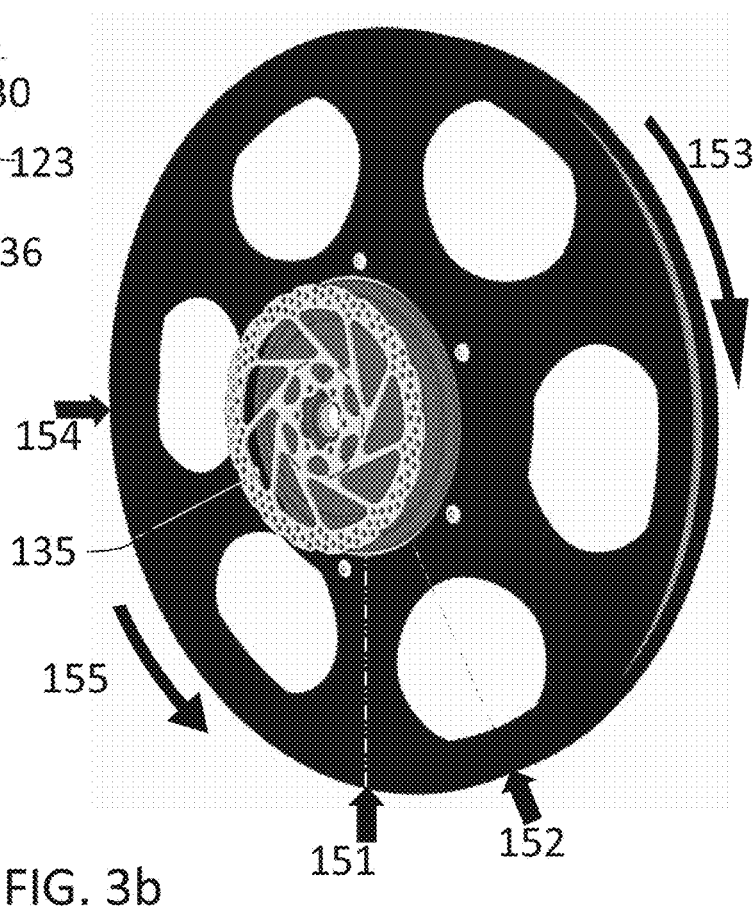
FIG. 3b show schematically forces applied to a wheel.

FIG. 3b shows further forces as the vertical force (arrow 151) applied to the longitudinal axis of a spoke and lateral forces 154. Lateral forces (see arrow 154 in FIG. 3b) are applied in the proximity of the annular portion or at the edge of the rim when travelling on a curved path and in case of collisions in accidents.

There are further torques that can be introduced into the wheel. When the wheel is accelerated or rotated a force 153 comprising one of a start-up torque, drive torque or acceleration torque occurs along the circumferences of the rim. By means of a device for braking as the disk brake 135 further opposite torques in direction of the arrow 155 can occur.

FIGS. 4a and 4b show in more detail the case if a vertical force F (see arrow 152) is directed substantially vertical to the outer periphery of the annular portion in a section between two adjacent spokes 125 and 126. The dashed ellipse 142 and corresponding arrows illustrate the elastic response of the outer leg 123 (of spoke 125) and the outer leg 121 (of spoke 126), which face each other and at least partially surround the window 140. FIG. 4*b* schematically illustrates the elastic torsion of spoke 126, wherein the upper side leg 121 twists upwards in relation to the wheel disk plane (see dashed dotted line 129).

The introduced energy (F, 152) can be efficiently dissipated by flexing and twisting the involved spoke members. That is to say the outer legs of each Z-cross section are configured to allow deflection into the direction of a curvature in order to absorb the high loads. Thereby, each of the outer legs facing each other deflect in analogy to a torsion bar spring and distribute the load of the vertical impact equally to both spokes. It is known that the flexural stress $\sigma_b$ (torque M/work W) of a plate spring of the height h, length l and width b can be calculated as follows:

$$\sigma_b = M/W = (6*F*l)/(b*h^2)$$

Such common formulas and formulas derived therefrom can be used in order to estimate the maximum permissible stress $\sigma_{bmax}$, wherein in analogy to a torsion bar spring the length l of the spring corresponds to the length of the flexural member of the Z-profile.

FIG. 5*b* shows schematically the production of the annular portion 110. FIG. 5*a* illustrates that the annular portion comprises a hollow profile with two diverging legs directed radially outward 111 and 112, wherein said profile is symmetric. Each end portion of the diverging legs 111, 112 has an integrally formed rim flange 114 protruding inwardly towards the symmetry axis of the profile. By means of the protruding rim flange 114 for example a clincher tire 119 can be hold (see FIG. 5*c*).

Further, said hollow profile includes transverse ribs 115 partitioning said hollow profile into a plurality of segments. The annular portion of the vehicle wheel of FIG. 5*a* is divided into 12 segments (see dashed curve sections), each segment comprising a plurality of ribs 115 having the same orientation as the radially outwardly orientated axis in the middle of each segment.

In order to produce this complex rib 115 and rim flange 114 structure it is required to use radially arranged sliders (see arrows 118) with a collapsible core.

Figure 6A:
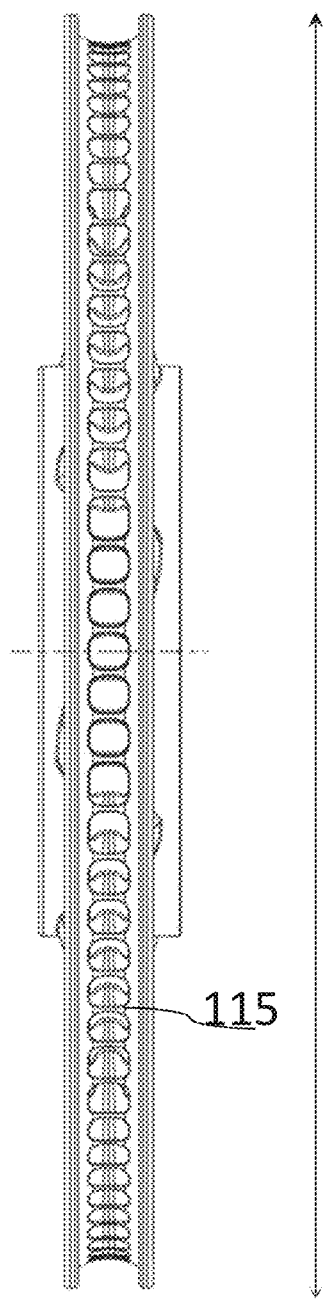
FIGS. 6a to 6c show a plan view on the hollow profile of the rim and detailed views of the valve adapter.
Figure 6B:
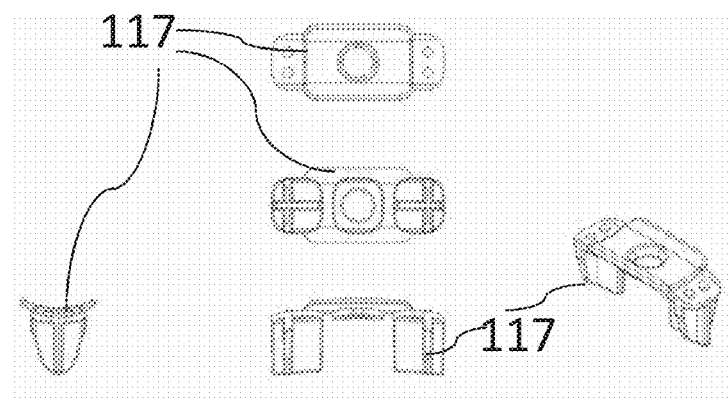
Figure 6C:
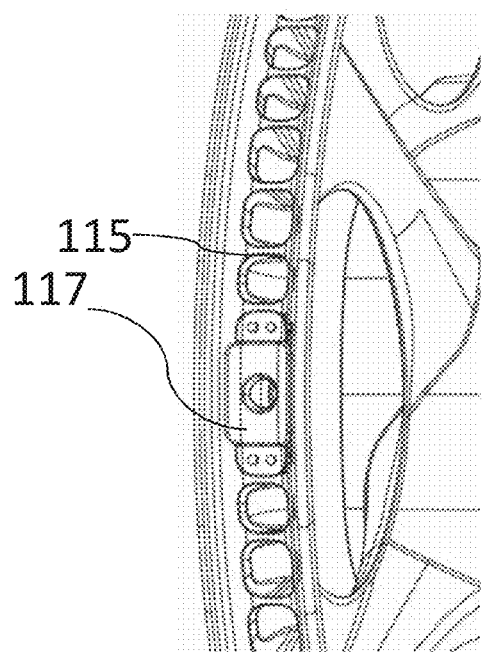

FIG. 6*a*-6*c* show a plan view on the hollow profile with a plurality of ribs 115 and detailed views of a valve adapter 117. The valve adapter 117 is configured to fit in 3 adjacent chambers formed by the rib structure. The bottom shape of the valve adapter 117 is configured to fit into two chambers, which have one chamber in-between. Said middle chamber in-between has at its bottom a through hole in order to introduce a valve.

FIG. 7 shows a schematic sectional view of a component 160 to be inserted in the shell of a rear or front hub comprising at least an axle and optionally a freewheel mechanism, a gear, a wheel hub motor and a surrounding housing. Alternatively, to the shown embodiment a wheel hub motor, gear or any other component receivable by the hub portion 130 can be inserted at least partially without a housing, when the hub portion 130 was configured to serve at least partially as a housing for the mountable component. The electric wheel hub motor 160, which is preferably driving a rear wheel hub, has a mounting width E for example of about 140 mm.

Further the reference F shows the extension of a thru-axle diameter (front/rear). Diameters for front thru axles may include a range between 9 and 20 mm and including preferably 10 mm, 12 mm or 15 mm. Rear axles typically have diameters of or 12 mm. Thru axles are known for example from mountain bikes. Said thru-axle can also be combined with disc-braked cycles and is not only suited for mountain bikes but also for road bikes and electrically driven bikes.

FIG. 8 shows a perspective view of the vehicle wheel and hub portion 130 of the side, which encloses a cavity configured to receive an electric wheel hub motor 160. The hub portion is pseudo hexagonal with the widest inner diameter $D_{HUB}$ In each of the rounded corners of the pseudo-hexagon a pair of ribs 134 is provided. Said ribs 134 can reinforce the hub shell and be used to guide the connecting elements such as screws (see reference numeral 161 in FIG. 11*a* or 12*a*) for fixation of the electric motor into the hub portion 130.

FIGS. 9*a* to 9*d* show cross sections of the vehicle wheel and hub portion 130 including an insert 139 and sectional views M-M and N-N. The insert 139 is fixed in the hub portion 130 and more particularly on top of a flange 133 that extends radially inwardly from the pseudo-hexagonal hub portion 130 of the wheel. The metal insert serves to hold mountable components comprising at least a wheel axle. In the present exemplary embodiment, the wall of the hub portion 130 extending parallel to the rotational axis (dashed dotted line) is in contact with the insert 139 (see FIG. 9*b*).

A side and plan view of a metal insert 139 is shown in FIGS. 10*a* and 10*b*. Said metal insert 139 has apertures 138 at each side of the rounded corner 132 of the pseudo-hexagon for better anchoring the insert 139 to the flange 133. The apertures tapers in direction away from the screw hole 166 and form substantially a drop-shape. The insert 139 is connected to the hub portion 130 by injection molding through the apertures 138 (see shaded area in apertures 138 in section M-M) and backmolding (see reference numeral 163 and shaded area in section N-N) at least a part of the insert 139 to achieve a force- and form-fitting.

Figure 11A:
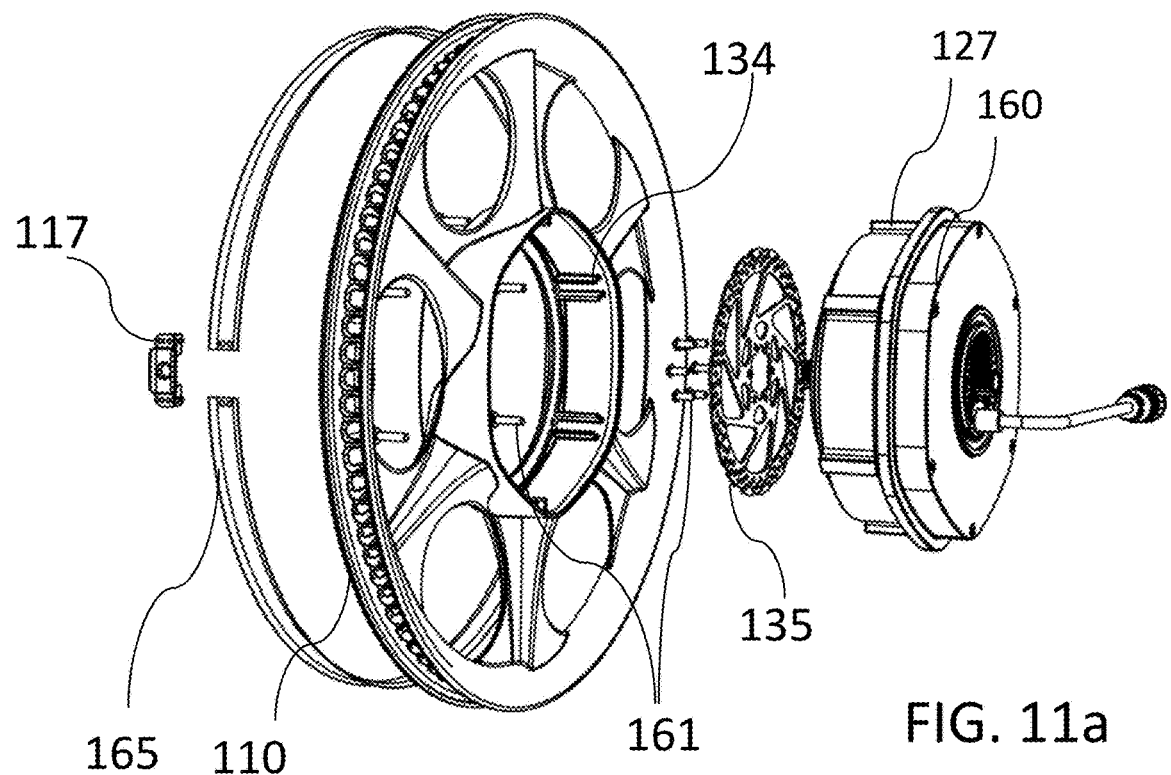
FIGS. 11a and 11b show a schematic perspective view and an exploded view.
Figure 11B:
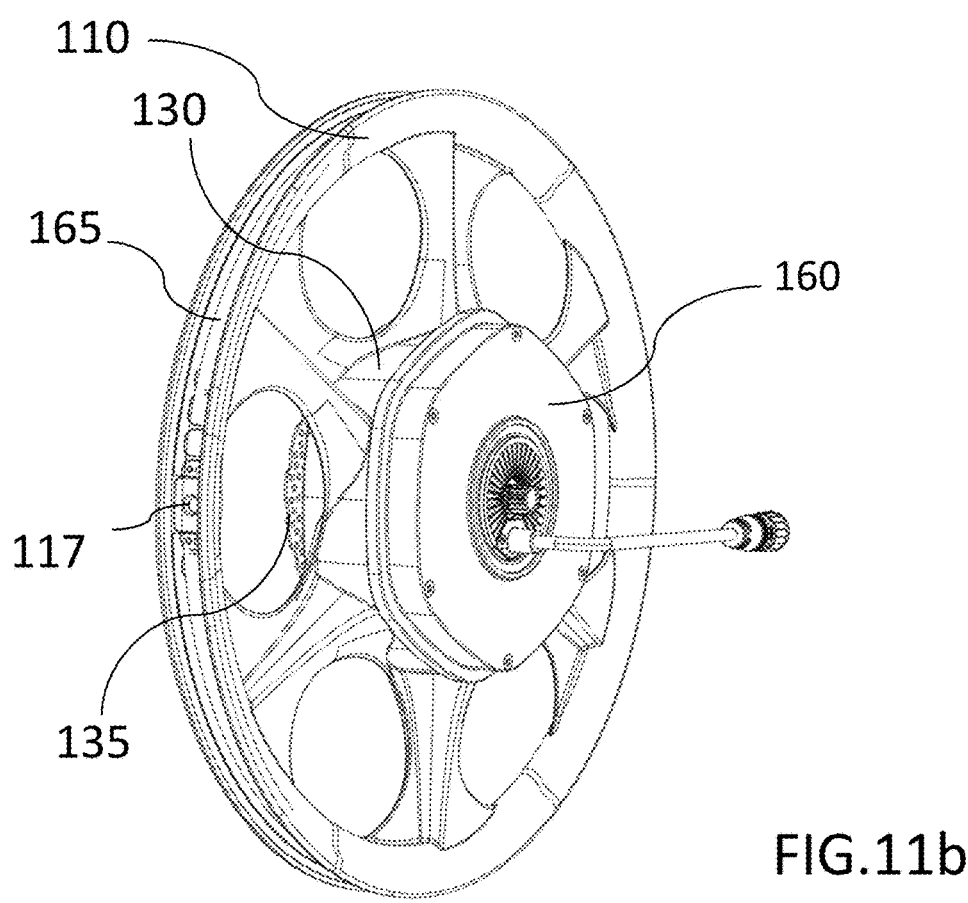

FIGS. 11*a* to 11*b* show a schematic perspective view and an exploded view of a plurality of wheel components. There are attachment means as screws 161 provided for attaching a disk brake 135. Further screws 161 are provided to attach the insertable component 160 comprising an electric wheel hub motor.

With regard to the annular portion 110 of the wheel FIG. 11*a* shows that a rim tape 165, which is particularly useful when clincher tires are attached to the rim. The rim tape preferably rests on the transverse ribs 115 of the hollow profile and supports the inner tube (not shown) against the tire pressure. For inflating a tire, the valve adapter 117 is provided (see also FIGS. 6*b* and 6*c*).

FIG. 11*b* shows the vehicle wheel in the mounted state, wherein the rim tape 165 and valve adapter 117 are inserted into the hollow profile of the annular portion 110 or rim. In the hub portion 130 a component 160 comprising an axle and an electric wheel hub motor is inserted, wherein on the other side of the wheel the disk brake 135 has been attached.

Figure 12A:
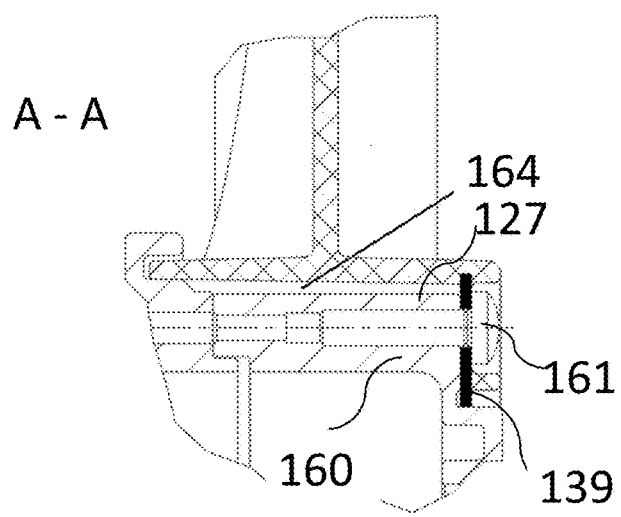
FIGS. 12a to 12c show cross sections of the hub portion.
Figure 12B:
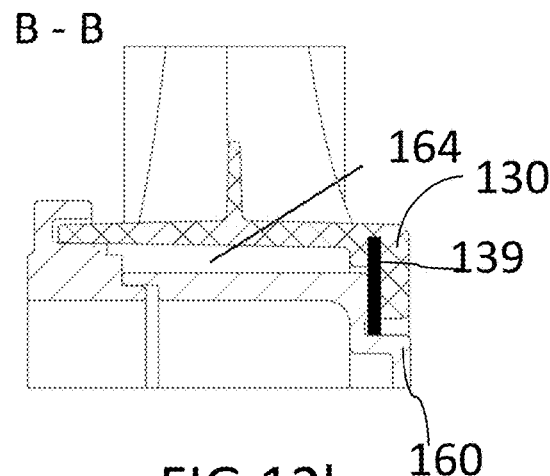
Figure 12C:
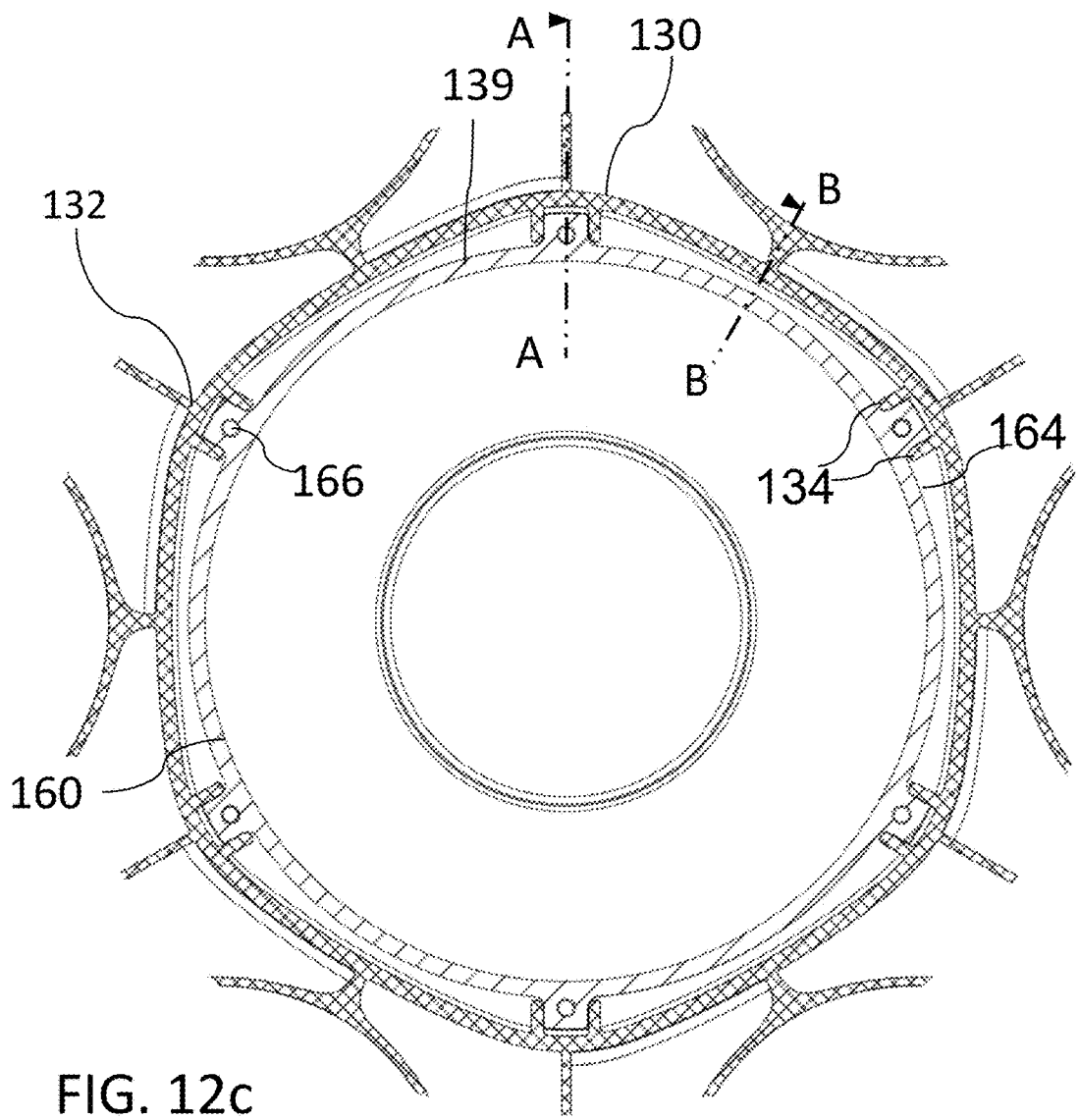

FIGS. 12*a* to 12*c* show cross sections of the hub portion 130 in the mounted or assembled state of the vehicle wheel 100. In each of the rounded corners 132 (see FIG. 12*c*) screws or other attachment means 161 can be introduced to form a rigid connection between the component 160 and the hub portion 130. Through axial twisting of the screws 161 through the holes 166 of the insert and corresponding holes of the hub portion 130 each screw 161 can be pressed against the metal insert 139. Thereby the axial screw pretension can be permanently maintained. It is especially advantageous that by connecting to a metal insert 139 the drawbacks of thermoplastic material as relaxation and creep can be avoided and a secure, long-term and stable connection between the hub and another component such as an axle, an electric motor, a hub dynamo, an internal gear hub can be provided.

Further the design of the inner hub portion 130 and especially the use of the ribs 134 do not only reinforce the hub shell but can also guide the protruding counterparts 127 of the insertable component 160 into the mounted position. Further said ribs 134 allow to provide in between the rounded corners 132 of the pseudo-hexagonal hub portion (see section B-B) an air gap 164 between the outer housing of the component 160 and the inner wall of the hub portion 130. This is especially advantageous if the component 160 comprises a heat source as an electric motor such that this air volume can serve as isolation.

Figure 13A:
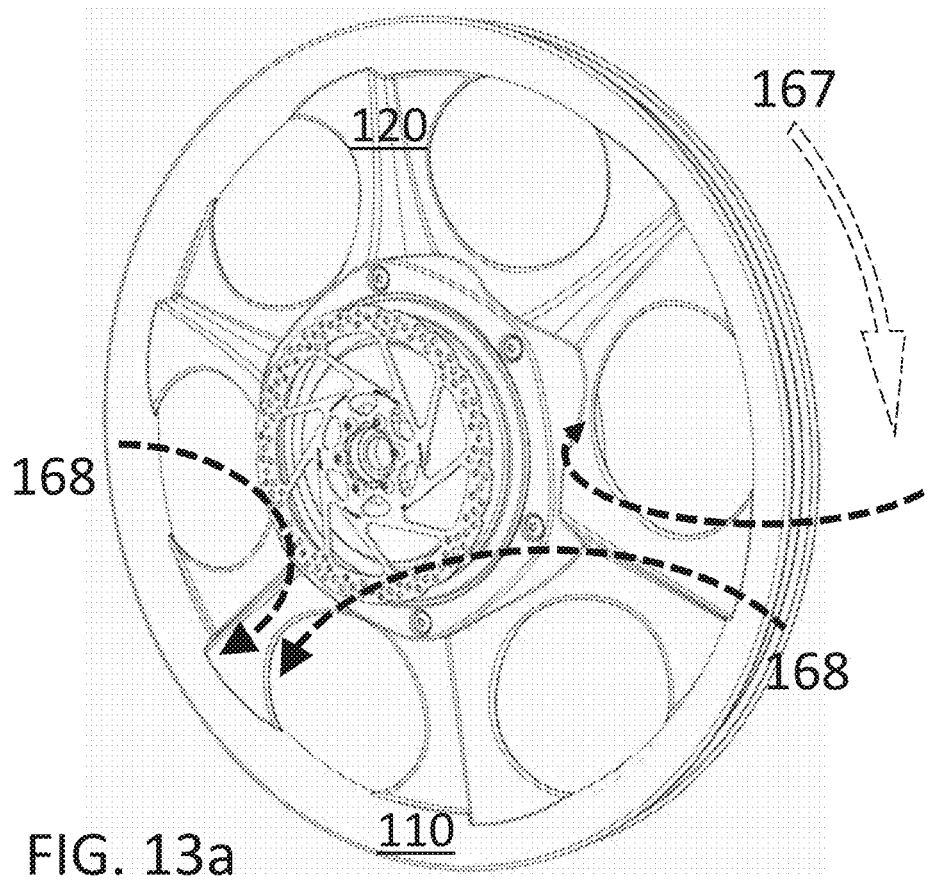
FIGS. 13a and 13b show schematically aerodynamic flows of a rotating wheel.
Figure 13B:
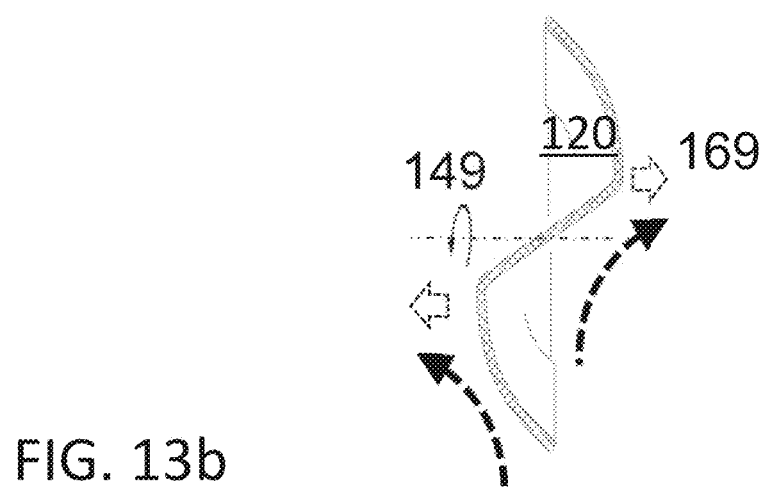

FIGS. 13a and 13b show schematically the aerodynamic flows of the vehicle wheel in operation. A rotational movement of the vehicle wheel is indicated with arrow 167. When the wheel with its Z-shaped spokes rotates air flows 168 are initiated. For example, there are air flows 168 passing by the heated brake disk or electric motor. Thus the heat that might be produced by a heat source as a hub motor in the center of the wheel can be efficiently reduced by ventilating the air away from the source.

FIG. 13b shows by means of dashed arrows the air flows for the case of a rotating wheel (see rotational direction around the axis indicated by arrow 149) along the Z-shaped cross section of an exemplary spoke 120. In this manner heat radiation 169 (indicated with the white arrow) of a heat source as an electric motor can be transported away from the source.

FIGS. 14a to 14c show unilateral suspensions 171 and 172 and a bilateral suspension 170. Bilateral suspensions as shown in FIG. 14a enable for example the use of the wheel as bicycle. If said bilateral suspension 170 is combined with the unilateral suspensions of FIGS. 14b and 14c, a tricyle can be formed. Moreover, the unilateral suspensions enable for example to provide four-wheel drive vehicles in which optionally a hub motor can be provided in one, two or each wheel hub. Accordingly, the inventive wheel can be combined with a plurality of vehicles. Such vehicles using the wheels according to the invention can be powered by mid-engines or hub engines according to the respective need.

In conclusion the vehicle wheel according to the invention has excellent stability characteristics and can be used in a wide field of applications including cargo cycles and electrically operated bicycles such as pedelecs and e-bikes. Since the wheel according to the invention meets high safety requirements, bicycles can be used as road cycles. In particular, the wheel is suited to be used for fleet bikes because they can be rapidly produced in one process step and in large quantities and in operation be easily maintained.

LIST OF REFERENCE NUMBERS 100 vehicle wheel
110 annular portion
111 leg of hollow profile of rim
112 leg facing leg 111
113 bottom of hollow profile of annular portion
114 inwardly protruding rim flange
115 rib
116 intersection point of spoke 126 with the rim
117 valve adapter
118 sliders
119 clincher tire
120 spoke
121 outer leg
122 middle leg
123 opposite outer leg
125 another spoke
126 adjacent spoke
127 protruding element for ribs 134
128 intersection point of spoke 125 with the rim
129 plane along middle of wheel disk
130 hub portion
131 maximum radius of pseudo hexagon
132 rounded corner
133 flange
134 pair of ribs
135 disk brake
136 partially sinusoidal connection line between spoke and hub portion
137 rotational axis
138 apertures
139 metal insert
140 window in wheel disk
142 ellipse
143 holes in flange 133
149 rotational axis
151 vertical force applied to spoke axis
152 vertical force applied between spokes
153 start-up torque, drive torque and acceleration torque
154 lateral force
155 braking torque
156 twisting of an outer leg
157 twisting of opposite outer leg
160 insertable component as e.g. electric motor with axle
161 screw
163 circumferential portion molded partially around insert 139
164 air gap
165 rim tape
166 holes of insert
167 rotational movement
168 valve adapter
169 heat radiation
170 bilateral suspension
171 unilateral suspensions on right side
172 unilateral suspension on left side

What is claimed is:

1. A vehicle wheel comprising: an annular portion, a plurality of spokes and a hub portion integrally formed by mould injection of fibre reinforced or carbon nano tubes containing thermoplastic,
    wherein each of the plurality of spokes comprise a substantially Z-shaped cross section with a middle leg and a pair of outer legs, wherein an angle enclosed by each of the pair of outer legs and the middle leg is greater than a right angle;
    wherein a length of the middle leg increases from the annular portion toward the hub portion;
    wherein said hub portion comprises a metal insert that comprises apertures for an injection molded and form-fitting connection to hold at least one of an axle, an electric motor, a hub dynamo, an internal gear hub or a wheel bearing, and wherein a wheel suspension can be configured unilateral or bilateral.

2. The vehicle wheel according to claim 1, wherein the middle leg is angled with regard to a rotational axis of the wheel.

3. The vehicle wheel according to claim 1, wherein each of the outer legs comprises at least one curved portion directed towards the middle leg.

4. The vehicle wheel according to claim 3, wherein a radius of the curved portion increases toward the annular portion.

5. The vehicle wheel according to claim 3, wherein the curved portions have a radius in a range between 3 to 20 mm and each Z-shaped cross section has a wall thickness in a range between 1.5 to 5 mm.

6. The vehicle wheel according to claim 1, wherein a length of the outer legs increases continuously towards a region for connection to the annular portion in order to widen a line along which the Z-profile is connected to the annular portion.

7. The vehicle wheel according to claim 1, wherein the Z-shaped cross section of each spoke is configured to be torsionally elastic for the compensation of a load, which is directed substantially vertical to the outer periphery of the annular portion in a section between two adjacent spokes.

8. The vehicle wheel according to claim 3, wherein the outer legs of each Z-cross section are configured to allow deflection into the direction of a curvature.

9. The vehicle wheel according to claim 1, wherein the wheel comprises at least four spokes and the ends of the legs of each spoke are interconnected at the hub in order to form semicircular or at least partially elliptic windows defined between the annular portion and pairs of adjacent spokes.

10. The vehicle wheel according to claim 1, wherein the hub portion is pseudo-pentagonal or pseudo-hexagonal shaped with rounded corners having at one side a radially inwardly extending rim for mounting the electric motor,
wherein each of said corners comprises vertically extending pair of ribs for guiding connecting elements and forming an air gap, when the electric motor is mounted.

11. The vehicle wheel in accordance with claim 1, wherein said fiber reinforced thermoplastic has a glass-fiber content of 20 to 65% by weight; and
wherein said thermoplastic is selected from PA6, PA6.6 or a mixture thereof.

12. The vehicle wheel according to claim 11, wherein said glass-fiber-reinforced or carbon nano tubes containing thermoplastic has a tensile stress at break of 100 MPa to 300 MPa, and an E modulus of at least 6000 MPa.

13. The vehicle wheel according to claim 1, wherein the annular portion comprises a rim with a symmetric profile, which has two diverging legs directed radially outward, wherein each leg has an end portion that has an integrally formed rim flange protruding inwardly towards the symmetry axis of the profile.

14. A method for producing a vehicle wheel, the method comprising the following steps:
injection molding a fiber reinforced or carbon nano tubes containing thermoplastic to integrally form a one-piece body comprising an annular portion, a plurality of spokes and a hub portion, wherein the plurality of spokes form a substantially Z-shaped cross section with a middle leg and a pair of outer legs,
wherein an angle enclosed by each of the pair of outer legs and the middle leg is greater than a right angle;
wherein a length of the middle leg increases from the annular portion toward the hub portion;
wherein said hub portion comprises a metal insert that comprises apertures for an injection molded and form-fitting connection to hold at least one of an axle, an electric motor, a hub dynamo, an internal gear hub or a wheel bearing, and wherein a wheel suspension can be configured unilateral or bilateral.

15. The method according to claim 14, further comprising connecting the metal insert to the hub portion by injection molding through apertures of an inlet and backmolding at least a part of the insert in a force- and/or form-fitting manner.

16. The method according to claim 14, further comprising providing and extracting a plurality of radially arranged sliders with a collapsible core in an injection tool to form an annular portion comprising a rim with a symmetric profile, which has two diverging legs directed radially outward, wherein each leg has an end portion that has an integrally formed rim flange protruding inwardly.

* * * * *